(12) United States Patent
Wilkes et al.

(10) Patent No.: US 10,963,304 B1
(45) Date of Patent: Mar. 30, 2021

(54) OMEGA RESOURCE MODEL: RETURNED-RESOURCES

(71) Applicant: GOOGLE INC., Mountain View, CA (US)

(72) Inventors: John Wilkes, Palo Alto, CA (US); David Oppenheimer, San Francisco, CA (US); Rafal Sokolowski, Cracow (PL); Walfredo Cirne, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/176,756

(22) Filed: Feb. 10, 2014

(51) Int. Cl.
*G06F 9/44* (2018.01)
*G06F 9/50* (2006.01)

(52) U.S. Cl.
CPC .................. *G06F 9/5005* (2013.01)

(58) Field of Classification Search
None
See application file for complete search history.

(56) References Cited

U.S. PATENT DOCUMENTS

| | | | | |
|---|---|---|---|---|
| 7,016,996 B1* | 3/2006 | Schober | ............... | G06F 13/362 710/113 |
| 7,386,851 B1* | 6/2008 | Zyuban | ................. | G06F 9/50 709/223 |
| 8,289,968 B1* | 10/2012 | Zhuang | ............. | H04L 61/2532 370/392 |
| 2004/0215777 A1* | 10/2004 | Piet | ................. | H04L 41/0806 709/226 |
| 2006/0075007 A1* | 4/2006 | Anderson | ............. | G06F 3/0652 |
| 2012/0023304 A1* | 1/2012 | Chan | ................. | G06F 9/546 711/170 |
| 2012/0096165 A1* | 4/2012 | Madduri | ............. | H04L 41/5009 709/226 |
| 2013/0097601 A1* | 4/2013 | Podvratnik | ............ | G06F 8/61 718/1 |
| 2013/0138806 A1* | 5/2013 | Gohad | ................ | G06F 9/5072 709/224 |
| 2013/0191541 A1* | 7/2013 | Kishan | ................ | G06F 9/5011 709/226 |
| 2014/0007097 A1* | 1/2014 | Chin | ................. | G06F 9/45533 718/1 |

(Continued)

OTHER PUBLICATIONS

Golding et al., "Idleness is not sloth", Winter'95 USENIX Technical Conference, New Orleans, LA, Jan. 16-19, 1995, pp. 201-222.

*Primary Examiner* — Hang Pan
*Assistant Examiner* — Lenin Paulino
(74) *Attorney, Agent, or Firm* — Lerner, David, Littenberg, Krumholz & Mentlik, LLP

(57) ABSTRACT

Techniques and systems are disclosed for allocating resources between two or more resource pools in a computing resource environment. Allocation may be realized by identifying a first resource in the first resource pool; creating a second resource based on at least a portion of the identified first resource; adding the created second resource to the second resource pool; identifying at least a portion of the added second resource as unused with respect to the second resource pool; creating a third resource based on the identified portion of the second resource; and adding the created third resource to a resource pool other than the second resource pool.

26 Claims, 7 Drawing Sheets

(56) References Cited

U.S. PATENT DOCUMENTS

2014/0082626 A1* 3/2014 Busaba ................ G06F 9/4881
718/104
2014/0297867 A1* 10/2014 Ennaji .................... H04L 67/22
709/226
2014/0343999 A1* 11/2014 Kim ................ G06Q 10/06313
705/7.23

* cited by examiner

OMEGA RESOURCE MODEL: RETURNED-RESOURCES

BACKGROUND

Today increasingly, a complex large-scale computing environment is composed of multiple systems. These systems are independently developed and interact with each other, as well as interact with the user(s). Each of these systems in the environment manages a great number of resources, which may include hardware devices, applications, and a range of other components and capabilities needed for system and resource management. Over-subscribed systems are particularly in need of effective resource management.

A challenge in such over-subscribed systems is ensuring sufficient headroom for heavy workloads associated with particular tasks, processes, or users. Conservative resource allocation schemes, however, may cause significant under-utilization of system resources by preventing otherwise unused resources from being returned or otherwise given back to the resource pool.

SUMMARY

In some embodiments of solutions discussed herein, a complex large-scale computing environment is composed of multiple systems. Such an environment may therefore be thought of, in some cases, as a system-of-systems. Such an environment may have one or more resource schedulers that manage system resources and allow various system tasks to utilize or access those resources or otherwise allocate system resources to perform certain tasks or functions.

In many complex, large-scale computing systems, a resource consumer, such as a particular task or job or application, may be required to provide an estimate of its intended or expected resource consumption. Such an estimate may, for example, be an intended or expected maximum resource utilization. A resource scheduler may then make appropriate scheduling decisions about which resources to allocate to the resource consumer and impose a limit on how many resources the resource consumer is permitted to consume. However, these estimates may be conservative (i.e. estimates that are too high/too big) because of the consequences associated with under-estimating resource needs (e.g. a job may be cancelled).

Such routine over-estimation of resource needs leads to a lot of idle resources being set aside "just in case." Similarly, such over-estimation may be a result of applications or tasks with highly variable usage levels or loads, where a task estimates resources needed for handling a peak load, but such peak load may be occasional or sporadic or periodic. In view of the foregoing, it is desired to provide or define a systematic way of allowing a resource scheduling system to recover or otherwise allow those "just in case" resources to be recovered and re-allocated to other resource consumers.

The foregoing objectives can be realized, in some embodiments, by, in a computing resource environment including at least one resource capable of being allocated to at least one of a plurality of resource pools, a method comprising: identifying a first resource within the computing resource environment that is allocated to a first resource pool within the computing resource environment; determining that the first resource is unused with respect to the first resource pool; creating a claim object based on the unused first resource, said creating including establishing a second resource quality of the claim object based on a first resource quality associated with the unused first resource; and adding a second resource to a second resource pool, the second resource pool being different from the first resource pool, the second resource being defined by the created claim object and being associated with the second resource quality.

In some embodiments, the first resource is determined to be unused in response to the first resource not being utilized for execution of a first task. In some embodiments, the step of determining that the first resource is unused includes: determining whether the resource usage associated with first resource will satisfy a threshold usage level for a threshold time; and in response to determining that the first resource will satisfy the threshold usage level for the threshold time, determining that the first resource is unused with respect to the first pool.

In some embodiments, the first resource represents at least part of a hardware component of a computing device.

In some embodiments, the step of establishing a second resource quality includes: determining the first resource quality of the first resource; determining a likelihood that the unused first resource will not remain unused with respect to the first pool; and establishing the second resource quality based on the first resource quality reduced by an amount based on the determined likelihood that the unused first resource will not remain unused with respect to the first pool.

In some embodiments, the first resource quality is represented by a forgiveness specification or a failure specification included in a previously-created claim object that defines the first resource. In some embodiments, the second resource quality is represented by a forgiveness specification or a failure specification included in the created claim object.

In some embodiments, determining a likelihood includes determining a likelihood for a specified time period; and adding includes adding the second resource to the second resource pool for no longer than the specified time period.

In some embodiments, establishing a second resource quality includes associating a forgiveness specification or a failure specification with the created claim object, the forgiveness or failure specification indicating an expected frequency and duration of a resource outage that the second resource may experience.

In some embodiments, the created claim object includes an lifetime determined by a time specification. In some embodiments, the forgiveness or failure specification indicates an expected frequency and duration of a resource outage that the second resource may experience during the lifetime.

In some embodiments, at least part of the unused first resource is represented by a previously-created claim object based on a third resource from a third resource pool, at least that part of the unused first resource being previously-added to the first resource pool based on the previously-created claim object.

In some embodiments, at least part of the unused first resource is represented by a previously-created claim object based on a third resource from the second resource pool.

In some embodiments, the unused first resource represents at least part of a previously-allocated resource added to the first pool from the second pool before the identifying step.

In some embodiments, the method further includes: determining that the second resource is unused with respect to the second resource pool; creating a second claim object based on the unused second resource, said creating including establishing a third resource quality of the second claim object based on the second resource quality; and adding a third resource to the first resource pool, the third resource being defined by the created second claim object and being associated with the third resource quality.

In some embodiments, the method further includes: determining that the second resource is unused with respect to the second resource pool; creating a second claim object based on the unused second resource, said creating including establishing a third resource quality of the second claim object based on the second resource quality; and adding a third resource to a third resource pool, the third resource pool being different from the first resource pool, the third resource being defined by the created second claim object and being associated with the third resource quality.

In some embodiments, the resource usage associated with the first resource satisfies the threshold usage level by being at or below the threshold usage level.

In some embodiments, the steps of determining that the identified resource is unused with respect to the first resource pool and of establishing a resource quality are performed based on an output of an idleness detector included in the computing resource environment.

In some embodiments, the step of determining whether a resource usage associated with the first resource satisfies a threshold usage level includes: determining that the resource usage satisfies the threshold usage level in response to a determination that the resource usage level is predicted or expected to be at or below a maximum threshold usage level at a predetermined future time.

In some embodiments, adding includes associating the created claim object with the second resource pool.

In some embodiments, adding is performed as part of the creating step by at least one of: including information identifying the created claim object in the second pool, and including information identifying the second pool in the created claim object.

In some embodiments, the threshold time is greater than or equal to zero. In some embodiments, the threshold time is a minimum threshold time.

In some embodiments, creating a claim object includes establishing a second resource quantity of the claim object based on a first resource quantity associated with the unused first resource; and the second resource is associated with the second resource quantity.

In some embodiments, creating a claim object includes establishing a second resource type of the claim object based on a first resource type of the first resource; and the second resource is associated with the second resource type.

In some embodiments, the second resource type is the same as the first resource type. In some embodiments, the second resource is defined by a resource specification included in the claim object.

Some embodiments may pertain to a method performed in a computing resource environment including at least one resource capable of being allocated to at least one of a plurality of resource pools, the method comprising: identifying a first resource within the computing resource environment that is allocated to a first resource pool within the computing resource environment; determining that the first resource is unused with respect to the first resource pool; defining a second resource based on the unused first resource, said defining including establishing a second resource quantity for the second resource that is no larger than a first resource quantity of the first unused resource, and establishing a second resource quality for the second resource that is based on a first resource quality associated with the first unused resource; and creating an offer for the second resource to a second resource pool, the second resource pool being different from the first resource pool, and the offer including information about the second resource quality and the second resource quantity.

In some embodiments, at least part of the unused first resource is represented by a previously-created offer based on an unused third resource from the second resource pool.

In some embodiments, at least part of the second resource is based on a third resource that was previously added to the first pool, the third resource having been represented by a previously-created offer based on an unused fourth resource from the second resource pool.

In some embodiments, the method further includes: determining that the second resource is unused with respect to the second resource pool; defining a third resource based on the unused second resource, said defining including establishing a third resource quantity for the third resource that is no larger than the second resource quantity, and establishing a third resource quality for the third resource that is based on the second resource quality; and creating an offer for the third resource to the first resource pool, the offer including information about the third resource quality and the third resource quantity.

In some embodiments, creating an offer includes creating an offer object representing the defined second resource.

In some embodiments, the method further includes adding the defined second resource to the second resource pool based on the created offer.

In some embodiments, the method further includes: identifying a third resource within the computing resource environment that is allocated to the first resources pool; and determining that the third resource is unused with respect to the first resource pool; the step of defining a second resource including defining the second resource based on the first unused resource and the third unused resource such that the second resource quantity for the second resource is based on the first resource quantity and a third resource quantity of the third unused resource and such that the second resource quality is based on the first resource quality and a third resource quality associated with the third unused resource.

In some embodiments, the second resource is defined by a resource specification included in the created offer.

In some embodiments, the first resource is determined to be unused in response to the first resource not being utilized for execution of a first task.

In some embodiments, the step of determining that the first resource is unused includes: determining whether the resource usage associated with first resource will satisfy a threshold usage level for a threshold time; and in response to determining that the first resource will satisfy the threshold usage level for the threshold time, determining that the first resource is unused with respect to the first pool.

In some embodiments, the step of establishing a second resource quality includes: determining the first resource quality of the first resource; determining a likelihood that the unused first resource will not remain unused with respect to the first pool; and establishing the second resource quality based on the first resource quality reduced by an amount based on the determined likelihood that the unused first resource will not remain unused with respect to the first pool.

In some embodiments, the first resource quality is represented by a first forgiveness or failure specification associated with the first resource; and the second resource quality is represented by a second forgiveness or failure specification included in the created offer.

In some embodiments, determining a likelihood includes determining a likelihood for a specified time period; and creating an offer includes creating an offer having a lifetime no longer than the specified time period.

In some embodiments, the created offer includes a lifetime determined by a time specification.

In some embodiments, the step of determining whether a resource usage associated with the first resource satisfies a threshold usage level includes: determining that the resource usage satisfies the threshold usage level in response to a determination that the resource usage is predicted or expected to be at or below a maximum threshold usage level at a predetermined future time.

In some embodiments, the threshold time is greater than or equal to zero.

In some embodiments, defining a second resource includes establishing a second resource quantity of the second resource based on a first resource quantity associated with the unused first resource.

In some embodiments, defining a second resource includes establishing a second resource type of the second resource based on a first resource type of the first resource.

In some embodiments, the second resource type is the same as the first resource type.

In some embodiments, the threshold time is a minimum threshold time.

In some embodiments, the resource usage associated with the first resource satisfies the threshold usage level by being at or below the threshold usage level.

Embodiments may pertain to a method of leasing-back at least a portion of a previously-allocated resource to a second resource pool from a first resource pool in a computing resource environment, the method comprising: identifying a first resource as the at least a portion of the previously-allocated resource within a first resource pool of the computing resource environment, the first resource being associated with a first resource quality; and offering the first resource to a second resource pool as a returned resource associated with a second resource quality, the second resource quality being based on the first resource quality.

In some embodiments, the previously-allocated resource includes a third resource previously offered to the first resource pool from the second resource pool such that the returned resource is based at least in part on the third resource offered to the first resource pool from the second resource pool.

In some embodiments, the first resource quality represents a likelihood of a resource outage with respect to the first resource pool; and the second resource quality represents a likelihood of resource outage at least as high as the first resource quality.

In some embodiments, the previously-allocated resource was previously offered to the first resource pool for execution of a first task; and identifying includes identifying the first resource as unused in response to the first resource not being utilized for execution of the first task.

In some embodiments, the first and second resource qualities each represent one of a plurality of quality levels, the quality levels including at least a highest level and a lowest level.

In some embodiments, offering to the first resource to the second resource pool includes determining whether the first resource quality is at a lowest quality; and in response to a determination that the first resource quality is not at the lowest quality, setting the second resource quality to be lower than the first resource quality; and in response to a determination that the first resource quality is at the lowest quality, setting the second resource quality to be the same as the first resource quality.

In some embodiments, the method further includes: in response to an indication that the first resource is now being utilized for execution of the first task, causing a resource outage in the returned resource such that the second resource pool is prevented from utilizing the returned resource while the first task is utilizing the first resource.

In some embodiments, the first resource includes at least one of a physical storage location, a processor, a process thread, memory access, memory space, storage space, network bandwidth, and storage access.

In some embodiments, offering includes offering for a set time period. In some embodiments, offering includes offering the returned resource for not more than an offer lifetime based on a time specification associated with the returned resource.

In some embodiments, the method further includes rescinding the offer of the returned resource in response to an outage of the first resource.

Embodiments may pertain to a method of leasing-back at least a portion of a previously allocated resource to a resource pool in a computing resource environment, the method comprising: identifying a first resource as the at least a portion of the previously allocated resource within a first resource pool of the computing resource environment, the first resource being associated with a first resource quality and a first resource quantity; creating a claim object that defines a returned resource based on the identified first resource, the claim object including a second resource quality based on the first resource quality, and a second resource quantity no larger than the first resource quantity; and adding the returned resource defined by the claim object to a second resource pool, the second resource pool being different from the first resource pool.

In some embodiments, the claim object includes a time specification defining a lifetime of the claim object.

In some embodiments, the previously-allocated resource includes a second resource previously added to the first resource pool from the second resource pool such that the returned resource added to the second pool is based at least in part on the second resource added to the first resource pool from the second resource pool.

In some embodiments, first resource quality represents a likelihood of a resource outage with respect to the first resource pool; and the second resource quality represents a likelihood of resource outage at least as high as the first resource quality.

In some embodiments, adding the returned resource includes adding the returned resource to the second resource pool for a time period not greater than the defined lifetime of the claim object.

In some embodiments, the first resource is a returned resource previously added to the first resource pool from the second resource pool.

In some embodiments, adding is accomplished by including information identifying the returned resource as being associated with the second pool in the claim object.

In some embodiments, the returned resource is defined by a resource specification included in the claim object.

In some embodiments, the second resource quality is represented by a forgiveness or failure specification included in the claim object.

In some embodiments, the step of creating is controlled by a scheduler in the computing resource environment.

Embodiments may pertain to a method performed in a computing resource environment including at least one resource capable of being allocated to at least one of a first resource pool and a second resource pool, the method comprising: identifying a first resource that is allocated to the first resource pool; first defining a second resource based on the first resource, said first defining including establishing a second resource quantity for the second resource that is no larger than a first resource quantity of the first resource, and establishing a second resource quality for the second resource that is based on a first resource quality associated with the first resource; first creating an offer for the second resource to the second resource pool, the first created offer including information about the second resource quality and the second resource quantity; determining that the second resource is unused with respect to the second resource pool; second defining a third resource based on the unused second resource, said second defining including establishing a third resource quantity for the third resource that is no larger than the second resource quantity, and establishing a third resource quality for the third resource that is based on the second resource quality; and second creating an offer for the third resource to the first resource pool, the first created offer including information about the third resource quality and the third resource quantity.

Embodiments may pertain to a method of allocating resources between a first resource pool and a second resource pool in a computing resource environment, the method comprising: identifying a first resource in the first resource pool; creating a second resource based on at least a portion of the identified first resource; adding the created second resource to the second resource pool; identifying at least a portion of the added second resource as unused with respect to the second resource pool; creating a third resource based on the identified portion of the second resource; and adding the created third resource to a resource pool other than the second resource pool.

In some embodiments, resource pool other than the second resource pool is the first resource pool. In some embodiments, the resource pool other than the second resource pool is a third resource pool.

In some embodiments, the first resource is associated with a first quality and a first quantity, the second resource is associated with a second quality based on the first quality and a second quantity based on the first quantity; and the third resource is associated with a third quality based on the second quality and a third quantity based on the second quantity.

In some embodiments, the first quality represents a first likelihood of outage of the first resource; the second quality represents a second likelihood of outage of the second resource, the second likelihood being at least as high as the first likelihood; and the third quality represents a third likelihood of outage of third resource, the third likelihood being at least as high as the second likelihood.

In some embodiments, a resource quality is represented by a plurality of discrete quality levels. In some embodiments, the third quality is at the lowest quality level.

In some embodiments, at least one of the first quality and the second quality is at a level above the lowest quality level.

In some embodiments, the step of adding the created second resource includes: creating an offer for the second resource to a second resource pool, the second resource pool being different from the first resource pool, and the offer including information about the second resource quality and the second resource quantity.

In some embodiments, the step of creating the second resource includes creating a claim object that defines the second resource and includes information about the second resource quantity and the second resource quality; and the step of adding the created second resource being performed as part of said creating step by at least one of: including information identifying the created claim object in the second pool, and including information identifying the second pool in the created claim object.

Some or all of the methods and method steps discussed above may be embodied as instructions or data structures on one or more non-transitory computer-readable media meant to cause one or more computers or processors to perform some or all of the method or method steps embodied thereon. Some or all of the methods and method steps discussed above may be embodied as instructions stored or otherwise held in a processor-readable memory of a system equipped with one or more processors and a processor-readable memory, the instructions being meant to cause the one or more processors to perform or otherwise control the performance of some or all of the methods or method steps.

Further scope of applicability of the systems and methods discussed will become apparent from the detailed description given hereinafter. However, it should be understood that the detailed description and specific examples, while indicating embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings that are given by way of illustration only and thus are not limitative.

Figure 1A:
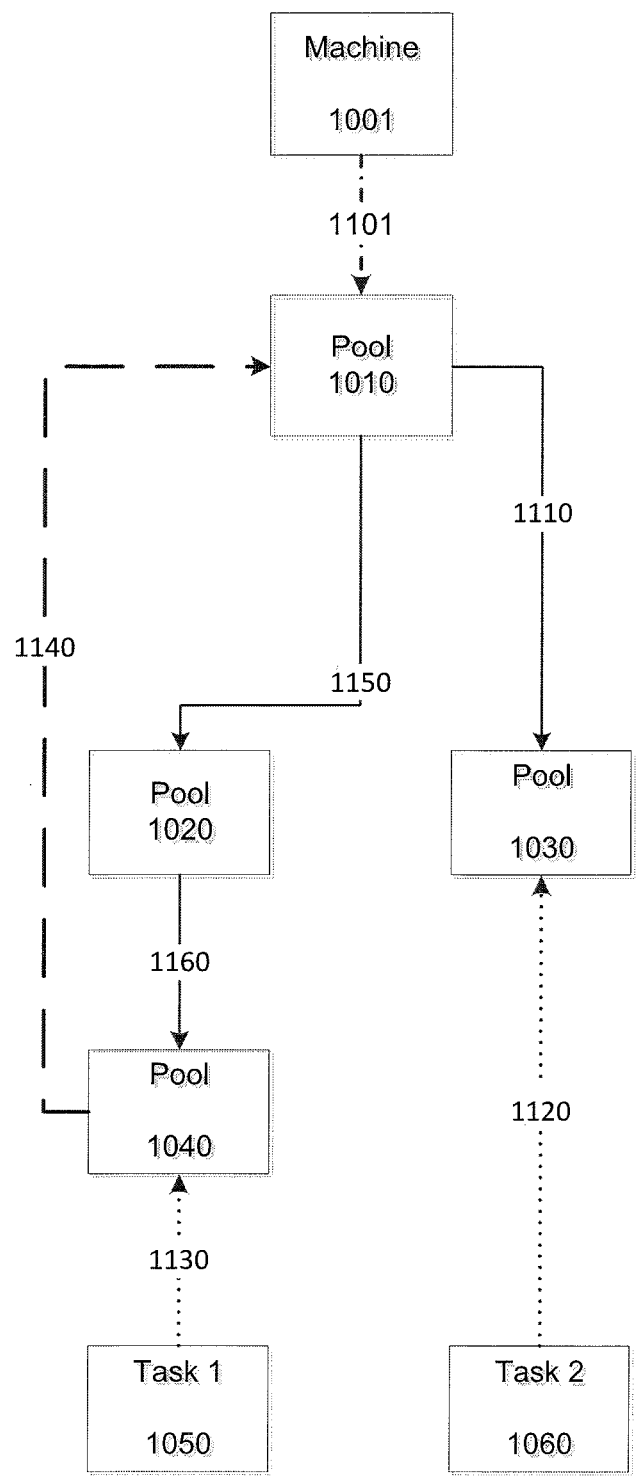
FIG. 1a shows a block diagram representing an embodiment of a resource graph as described herein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

Definitions: within the context of this document, the following terms will have meanings consistent with the definitions set forth below a. Resource: a physical or logical component of a computing system or computing environment or a data item or data collection stored in or accessed by a computing system or computing environment. A "resource" can be specifically identified for purposes of access, processing, tracking, control, or other uses within a system by means of a data structure, logical object, or other structured information representing the resource and/or its inherent or associated properties. Examples of resources include: running processes, applications, physical storage locations, virtual machines, processors, process threads, processor access time, memory, storage space, network bandwidth, storage access time, databases, database entries, and other system objects and/or components. A resource may also be a part of such an entity (e.g., some of the memory in a system), and it may be composed from collections of such entities or their parts (e.g., two different chunks of memory). The term "resource" may therefore be used to represent all or part of an underlying resource instance or to represent the result of collecting one or more other resources (e.g., if there are two memory resources, a third resource could represent part or all of the union of the two).

b. Scheduler: a system, hardware, software, application, or combination thereof that allocates or offers resources to tasks and jobs that request or require those resources in order to be executed or completed or otherwise performed. An offer is when one or more resources are indicated as available, or "offered", to a scheduler to fulfill a particular resource request. In some embodiments, an offered resource may be claimed by or for a resource request, thereby causing the resource to be claimed by, or allocated to, the resource request.

c. Claim: a claim is a reservation of resource(s) against a pool; it may specify a period of time for which it applies. A claim may reserve resource(s) on a single physical entity (e.g., a single machine, RAID, network switch, etc.) or on multiple physical entities (e.g. a database, database system, or group of databases spanning multiple physical storage locations). Claims are not necessarily bound to any particular resource but may instead be bound to resource pools, which are defined below. A claim may include one or more quantities that provide information about an amount of resource(s) being reserved or to be reserved. A claim may also include zero or more qualities that provide information about the resources being reserved or to be reserved. A claim may have a lifetime determined by a time-spec (defined below) associated with or included in the claim. A claim may equivalently and interchangeably be referred to as an "offer", and these terms (offer and claim) describe the same thing. In addition to or in place of a lifetime, a claim may be subject to withdrawal or rescission because of various factors, including ones such as inaccurate or incorrect outage predictions or estimates or unexpected resource outage or usage.

d. Outage: an outage is a period of time in which an offer does not meet its resource specification. Outages may be caused by hardware or software failures, removal of a claim from which the offer is derived, planned system or device maintenance, or other causes.

e. Forgiveness Specification: this is a resource quality representing outages the claim can withstand without being evicted (removed). The forgiveness spec may include one or more of a type, a number, a frequency and a duration of the forgivable outages, and may include multiple such specifications. Outages that occur less often, and for shorter than the forgiveness spec are forgiven, and the claim will not be evicted.

f. Failure Specification: this is a resource quality which describes the expected frequency of outages that claimed resources may experience. The failure specification may include information about the expected durations of outages. In some embodiments, a failure specification may be expressed in the same form as a forgiveness specification. In some contexts, such a failure specification may act as a forgiveness specification. In other contexts, a forgiveness specification may act as a failure specification.

g. Resource Pool: a resource pool combines resources provided by one or more offers, allowing a claim to draw from multiple offers and allowing an offer to support multiple claims. A resource pool may be a passive "ledger" that tracks inflows and outflows of resources based on claims of resources leaving the pool and offers for resources entering the pool. The claims and offers associated with a particular pool may be created, matched, and/or managed by a scheduler.

h. Resource Specifications: claims may have associated resource specifications which describe one or more resource types, quantities, and qualities. Resource types may include process thread, processor core, RAM space, disk space, disk access time, etc. Quantities include a quantifiable unit or measure of a desired resource (e.g., number of threads, number of processor cores, amount of RAM, amount of disk space, amount of disk usage time per second, number of calculations, number of database records). Qualities are features that a resource may have or should have. Qualities may include minimum latency times, availability percentages, processor speed, etc. In some embodiments, a resource specification may describe multiple resources and/or multiple resource types. A resource specification, for example, may specify processor, memory, and storage resources, or resource combinations drawn from one or more underlying resources, or even resource pools. In some embodiments, resources from claims for the same resource type into the same pool may be combined into one new resource. Quantities for the same resource type may add together when claims are combined. In some embodiments, qualities may not add when claims are combined.

i. Time-Spec: a time-spec may define one or more time-periods. Such definition may be realized by combinations, groupings, or pairings of time-related values. Embodiments may include a combination of a start time and duration value pair, a start time and an end time value pair, a duration and end time value pair. In some embodiments, the start time of a time-spec may be implied by the time at which a claim is created. In some such embodiments, the time-spec may only include an end time or a duration. In some embodiments, a time-spec may include periodicity or recurrence information.

The above-provided definitions may be better understood with reference to a resource graph, depicted in FIG. 1a. In the resource graph, an individual physical machine 1001 or device or resource provides resources 1101 to an initial, or "base" pool 1010. Resources may include entire physical machines and network switches and physical storage arrays, or parts of the resources of one machine or device, or some combination of these. Some or all of the resources from the base pool 1010 may be claimed 1150 by a pool 1020 from which further resource allocations may be made.

In the embodiment shown, claim 1150 offers (provides) resources to a pool 1020. In turn, some or all of those resources may be claimed 1160 for a pool 1040. The resources in pool 1040 can be used (or consumed) by one or more task(s) 1050. Claims are typically bound to pools and not to individual offers, but may refer to particular resource offers in some cases.

In an embodiment of unused resource reclamation or return, resources from the pool 1040 may be offered 1140 as returned resources to the pool 1010. Embodiments of systems and logic supporting a decision to offer such returned resources and embodiments of systems and logic relating to how such resource return may be realized will be discussed later in this document.

The returned resources claimed 1140 for the pool 1010 may, in some embodiments, have a reduced quality as compared to the unused or idle resource from which the returned resource is derived. Is some embodiments, the returned resources may not be explicitly marked or identified as returned, so that they can be treated similarly to other resources, e.g., for purposes of scheduling, usage, allocation, and claiming. One or more claims 1110 may then offer resources (including returned resources) to one or more pools 1030, which can provide resources for one or more tasks 1060 that use 1120 resources. In some embodiments, if a task 1060 using resources from a resource pool 1030 attempts to use more resources than are available in that pool, the task may have its usage reduced or throttled, or the task may be suspended or killed or otherwise halted.

The offer 1140 of returned resources may, in some embodiments, be for a limited duration. In some embodiments, the duration may be governed or determined by a time-spec included in the offer. In some embodiments, the duration may be limited or curtailed by, for example, rescission of the offer because the resources from which it is derived are no longer available, or because a prediction used to create the offer proves invalid (e.g., if a task uses more resources than was expected), or because the pool 1040 may have a need for the resources (e.g., if an existing tasks starts using them, or a new task requires them, or a new or different pool claims them, or because an existing outgoing claim is increased in priority).

In some embodiments, a logical representation of the returned resource may be created in the resource pool 1010 into which the returned resources are claimed 1140 or in the resource pool from which they are offered 1040. In some embodiments, both may be done. In some embodiments, the representation of the returned resource may be independent of the source pool 1040 or the target pool 1010.

Although depicted in FIG. 1*a* in the context of returning resources from a pool 1040 that provides resources for tasks to use, returned resources may be offered from any resource pool to any other resource pool in the manner depicted herein. Although depicted in FIG. 1*a* as being offered 1140 to the topmost (e.g. base) resource pool, a returned resource can be offered to some other pool. In some embodiments, returned resources may only be offered to the immediate parent of the pool from which they are reclaimed. Such an embodiment is depicted in FIG. 1*b*.

Figure 1B:
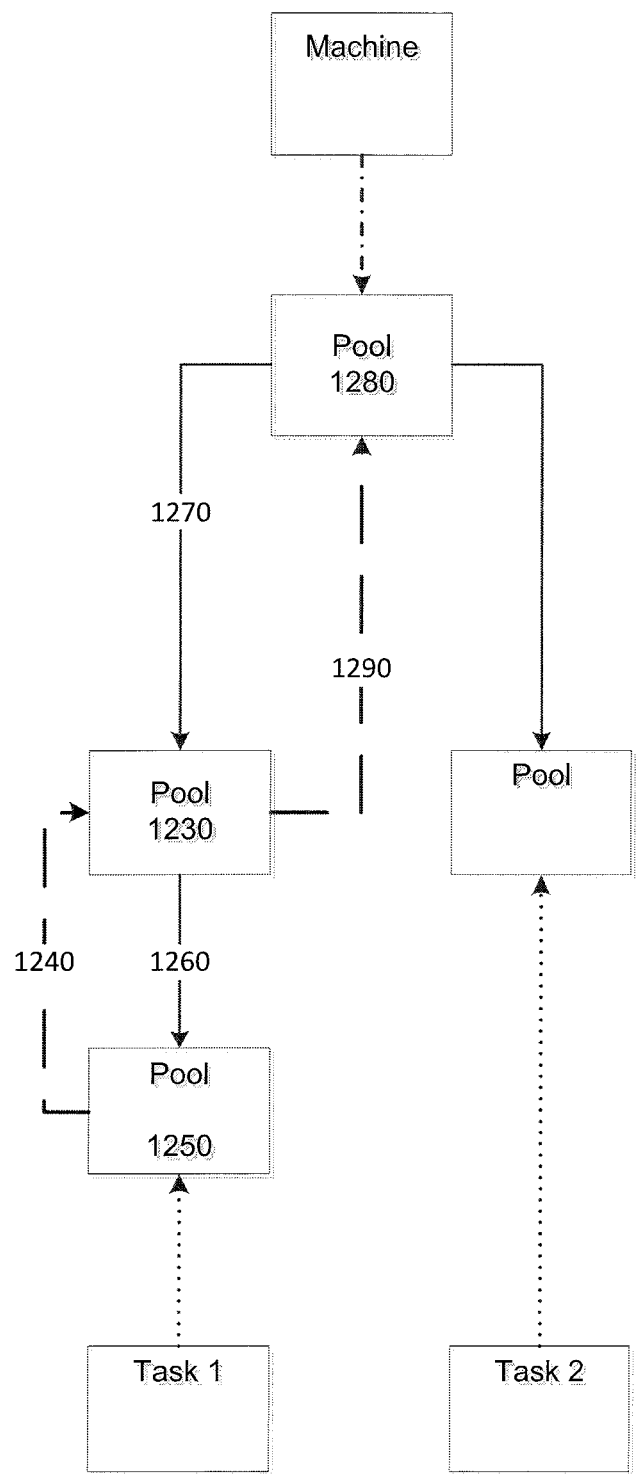
FIG. 1b shows a block diagram representing an embodiment of a resource graph as described herein.

In the embodiment shown in FIG. 1*b*, resources from a resource pool 1280 may be offered 1270 into an intermediate resource pool 1230. The intermediate pool 1230 resource may then be claimed 1260 for another pool 1250. Unused resources from such a pool 1250 may then be offered back 1240 to the intermediate pool 1230. In such an embodiment, an unused resource may always be offered back to the pool from which it was claimed.

In some embodiments, returned resources may be offered 1290 from an intermediate pool 1230 to its parent pool 1280. In some embodiments, the resources offered 1290 back to the parent pool 1280 from the intermediate pool 1230 may include returned resources offered 1240 from the task-available pool 1250 to the intermediate pool 1230. Returning an unused resource to the immediate parent of the pool from which it is reclaimed may prevent a cascading or otherwise rolling resource outage across multiple pools in the event the returned resource is reclaimed by the task or pool from which it was initially offered back 1240.

In some embodiments, resources from physical machines or devices may be explicitly offered to a root or base pool so that their properties can be described in a similar manner to other offers. In other embodiments, such root resources may be defined using representations attached to, or part of, a root pool.

Figure 1C:
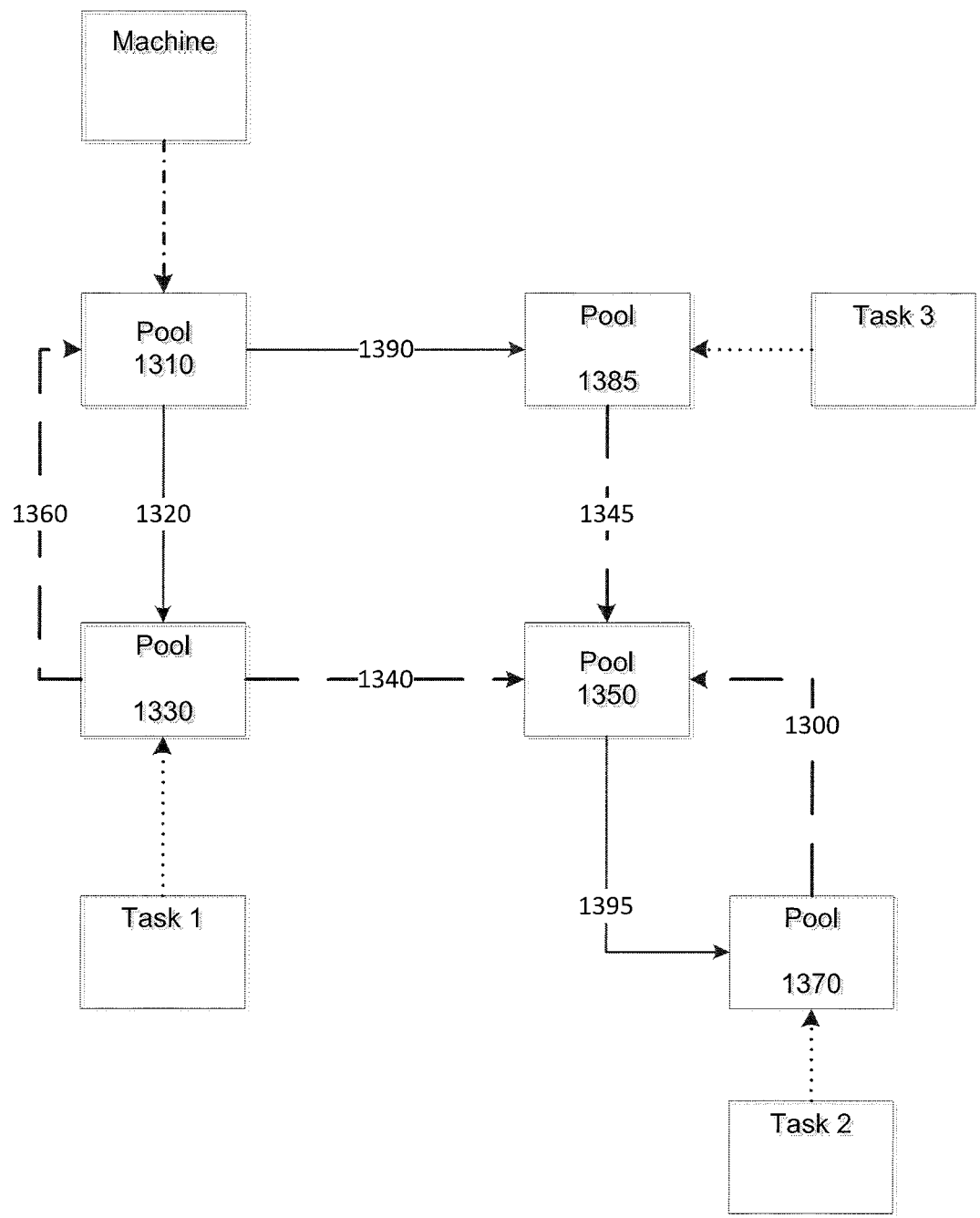
FIG. 1c shows a block diagram representing an embodiment of a resource graph as described herein.

In some embodiments, resources may be offered as returned resources into pools which may in turn offer returned resources, potentially causing a resource to be returned multiple times to different resource pools, although its qualities may change. Such an embodiment is depicted in FIG. 1*c*. In the embodiment shown, resources from an intermediate pool 1310 may be claimed 1320 into a pool 1330. In some embodiments, unused resources at or below a predicted or expected quality (e.g., resources with a low availability or that are expected to have more than a certain number of outages for a given time period) may be offered 1340 to a returned resource pool 1350 whereas resources from the pool 1330 that are associated with a higher predicted or expected quality may be offered 1360 as returned resources back to an intermediate pool 1310. Although qualities are discussed with respect to resources, a resource quality may be defined and varied through a claim, as defined below. Other embodiments may include or apply different criteria to determine which pool(s) should be receiving returned resources based on factors such as resource type(s), offer lifetime(s), zero or more resource qualities and/or values thereof, and other quantifiable aspects of a resource or resource offer.

In some embodiments, a pool 1310 may have its resources claimed 1320, 1390 by multiple child pools 1330, 1385. In some embodiments, a pool 1330 may have some or all of its returned resources offered 1360 to its parent pool 1310.

In some embodiments, one or more low-quality or minimum quality resource pools may be created expressly for resources at or below a certain quality threshold. In the embodiment shown in FIG. 1*c*, a resource pool 1350 may include only returned or low-quality resources. The returned resources from the returned resource pool 1350 may then be claimed 1395 for a task-available pool 1370.

Embodiments utilizing specific resource pools for returned resources may allow for pools to be created especially to make resource available to tasks that are tolerant or forgiving of resource preemption. In some embodiments, a pool 1370 that includes resources claimed 1395 from a returned resource pool 1350 may itself cause returned resources to be offered back 1300. Such resources may be offered back to the returned resource pool 1350.

In some embodiments, a resource pool 1350 may be created or otherwise managed especially for the lowest-quality or otherwise high-risk resources. In some embodiments, such a minimum-quality resource pool 1350 may receive, through claims 1300, 1340, 1345, any low- or minimum-quality resources from other pools 1385, 1370. Such minimum-quality resources may then be claimed 1395 into one or more pools 1370 for utilization by tasks tolerant or forgiving of such low quality resources.

A resource pool may be deemed feasible if the requirements of the claims on the pool can be met by the union of the resources offered into the pool. Feasibility may be determined for a pool by performing a feasibility test, which, in some embodiments, may ignore claims or offers experiencing a forgivable outage. Embodiments of a feasibility test may include ensuring that each resource that a claim is bound to has quality measures at least as high as the claim and that those resources provide a composite surety or reliability at least to a level requested or required by the claim. In some embodiments, a feasibility test may include ensuring that the resource(s) described by a claim have a individual or combined quantities at least as high as the claim. A feasibility test may check that sufficient quantities are available of the resources described by all non-suspended claims against a pool.

Figure 2:
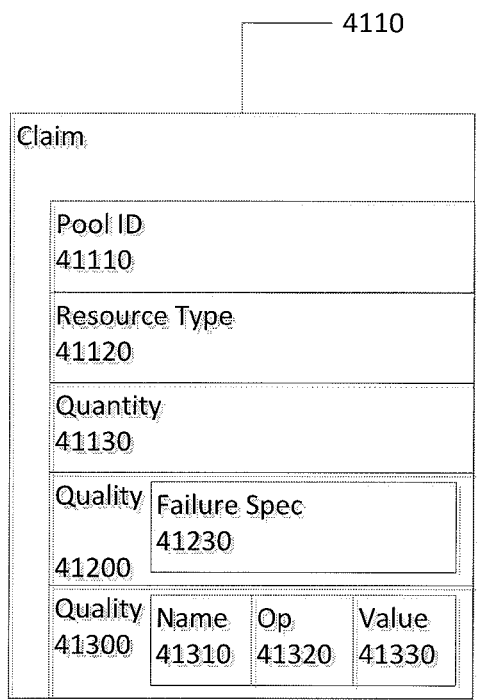
FIG. 2 shows a block diagram representing an embodiment of a logical depiction of a claim as described herein.

An embodiment of a logical depiction of a resource claim is shown in FIG. 2. In the embodiment shown, a claim 4110 may be associated with a particular pool 41110. In some embodiments, the claim 4110 may be either directly or indirectly associated with one or more resources in a resource pool 41110.

The claim 4110 may be for one or more resources of a particular resource type 41120, such as memory capacity or processor cycles. The claim 4110 may also include an indication of resource quantity 41130. The resource quantity 41130 indicates how much of the resource type 41120 the claim is requesting. In embodiments where multiple individual resources are combined into a single offer, the quantity 41130 may indicate a total quantity of resources.

In some embodiments, a claim 4110 may also include one or more desired or required resource qualities 41300. As noted above, qualities are features that the claimed resource (or resources) has. In some embodiments, a quality 41300 may include a name 41310 identifying the particular feature or attribute the quality refers to. In one embodiment, for example, the name 41310 of a quality may indicate that it relates to an operating system or operating system version or a particular processor architecture, or that it relates to a processor speed, or a failure rate, or any other valid kind of quality. In some embodiments, the name 41300 may be omitted. In some embodiments, the name 41300 may be replaced by or supplemented with a quality ID or type.

The quality may include a value 41330 that may be a continuous value such as, for example, a failure rate, or a discrete value selected from among a set of possible values (e.g. high, medium, low). The value field may be used to represent either a continuous quantity or a discrete one. In some embodiments, a discrete value may be referred to as a quality level. In some embodiments, the value 41330 represents a value associated with the desired quality. In some embodiments, the value 41330 may indicate a minimum required quality for the resource (e.g., processor speed for a CPU resource).

For example, in embodiments where the name 41310 of a quality 41300 indicates that the quality relates to an operating system version, the value 41330 may include an operating system version number. As another example, in embodiments where the name 41310 of a quality indicates that the quality relates to a hard drive speed, the value 41330 may include a required minimum or maximum rotation speed (RPM, or revolutions per minute) of the hard drive. In some embodiments, a quality 41300 name 41310 may be used so as to allow those entities or users having a knowledge of the particular quality 41300 to readily identify resources having that quality. Other embodiments may have stronger or weaker connection between the name 41310 of a quality 41300 and the value 41330.

In some embodiments, a claim may be for multiple resource types, each having a respective quantity and zero or more respective resource-type-related qualities associated therewith.

In some embodiments, a claim may also be associated with a time-spec (not shown). In some embodiments, the time-spec of a claim may be determined by the resource(s) or resource pool or scheduler originating or otherwise governing the creation of the claim.

In some embodiments, the value 41330 may represent a likelihood that the resource(s) associated with the claim 4110 will not experience an outage over the claim lifetime (in some embodiments, this may be referred to as reliability or surety).

In some embodiments, quality levels may be represented by "buckets" or other discrete indicators. For example, resources that have an annual failure rate of less than 0.01% may be associated with a top quality level, resources that are more than 0.01% but less than 1% likely to experience outage may be associated with an intermediate quality level, and resources more than 1% likely to experience outage may be associated with a worst quality level. In some embodiments, such a worst quality level may be a level of quality below which it is not necessary to track resource outage rates or likelihoods. In some such embodiments, quality may simply be indicated as being at the worst level. For example, a worst or lowest quality may signal that the offer or claim is related to or suitable for the worst quality resources.

In some embodiments, a claim 4110 may also include a quality 41200 representing a failure spec 41230 as defined above. In some embodiments, a failure spec 41230 may be determined from known or expected rates at which outages occur. In embodiments where a claim 4110 includes or is associated with multiple resources, outage rate calculations (and quality calculations) may require probabilistic analysis.

In some embodiments, a claim 4110 may include or be represented at least in part by a vector containing elements of the format <resource type, resource quantity, resource qualities>.

In some embodiments, a quality may include an implicit operator 41320 that means or indicates a requirement for a value at least as good as the value 41330 specified in the quality. In some embodiments, a quality may include an express operator 41320 that may represent or indicate "<" (less than), "<=" (less than or equal), "=" (equal), ">" (greater than), ">=" (greater than or equal), "~" (regular expression matching/evaluation), "!" (not) operator, matching of alphanumeric strings or wildcards, or combination thereof.

In some embodiments, a claim may have a quality indicated by a surety or surety level. Surety is a quality that represents a likelihood that a claim won't be evicted over its lifetime or experience some other kind of outage. In some embodiments, a quality 41200 may indicate a forgiveness spec that includes a type, number and frequency of outages the claim can withstand without being evicted.

A claim may contain a set of resource quantity and quality specifications. These may represent the minimum acceptable quantity and quality that the claim can consume (in it's "take"), and the maximum that it offers at the other end. For example, if a claim describes 2 CPU cores (a quantity) that must have a minimum speed of 2 GHz (a quality), then any 2 GHz or 3 GHz CPU resources are acceptable, but users and claimants of the offered resources cannot assume that they are faster than 2 GHz.

In some embodiments, a claim's surety, failure spec, reliability, and/or related outage data indicating or otherwise representing a measure of reliability may be determined from known or expected rates at which unforgivable outages occur and from known or likely rates of pre-emptions, which are situations where a claim is evicted (or suspended) in favor of a different load (which may include different tasks for different claims).

In some embodiments, an offer of one or more resources may be bound to a pool such that the resource(s) being offered are uniquely identified within the computing resource environment by a combination of an identifier unique to the pool (not shown) and a pool identifier 41110 unique across all pools within the computing resource environment.

In some embodiments, resource availability or reliability quality 41300 may be determined by a variety of factors including known or predicted outages or resource failures. Failures that affect resource availability or reliability quality may include factors such as underlying hardware faults, underlying software or operating system faults, mis-predictions of whether a resource will be used by a task or pool, pre-emption or eviction of a resource claim or pool that is returning resources, priority of a resource consumer (lower priority resource consumers being more likely eviction targets), and suspension of resources due to things like maintenance tasks or draining a machine. Failure rates may be calculated from such factors based on known or expected failure rates, measurements and historical performance data, and combinations thereof. In some embodiments, resource availability or reliability quality 41300 may be represented by continuous or discrete values as described above.

In some embodiments, each time a returned resource is offered to a resource pool, the returned resource may be added back at a lower quality than the resource from which the returned resource is derived. For example, in some such embodiments, if a claim with a surety level of X is satisfied by an offer of resource quality level X, the subsequent offer of returned resources based on the claim may be for resources of resource quality level X−1. In some embodiments, such quality reduction may continue until a resource offer reaches the minimum quality level. In some embodiments, minimum-quality resources may also be candidates for offer as returned resources, but the quality of the returned resources is no lower than the resources from which they were derived.

With respect to the offer of returned resources and their inclusion in a resource pool, embodiments of techniques and solutions described herein relate to enabling and improving the ability and opportunity for task pools to claim such resources.

Techniques and systems disclosed herein relate to:
a. Using predictions of how many computing system resources are going to be used to determine how many of those resources assigned to a particular application/job/task are likely to be unused (and, in some embodiments, the likelihood that they will not be used).
b. Explicitly returning all or part of these likely-unused resources to a resource pool by adding them back in as additional resources for allocation. In some embodiments, such resources may be added back at a lower quality or quality level than the resources they were derived from. Such embodiments may free schedulers from having to track which resources are reclaimed by indicating a reclaimed resource through a quality level.
c. Resource consumers may be labeled or associated with a minimal-acceptable quality such as one or more of a maximum failure rate, maximum failure level, minimum surety, etc.
d. Resource schedulers may then use this quality information to filter out those system resources available and suitable for allocation and make placement decisions for the resource consumers that take into account the quality of the available resources (including the returned resources).

Figure 3:
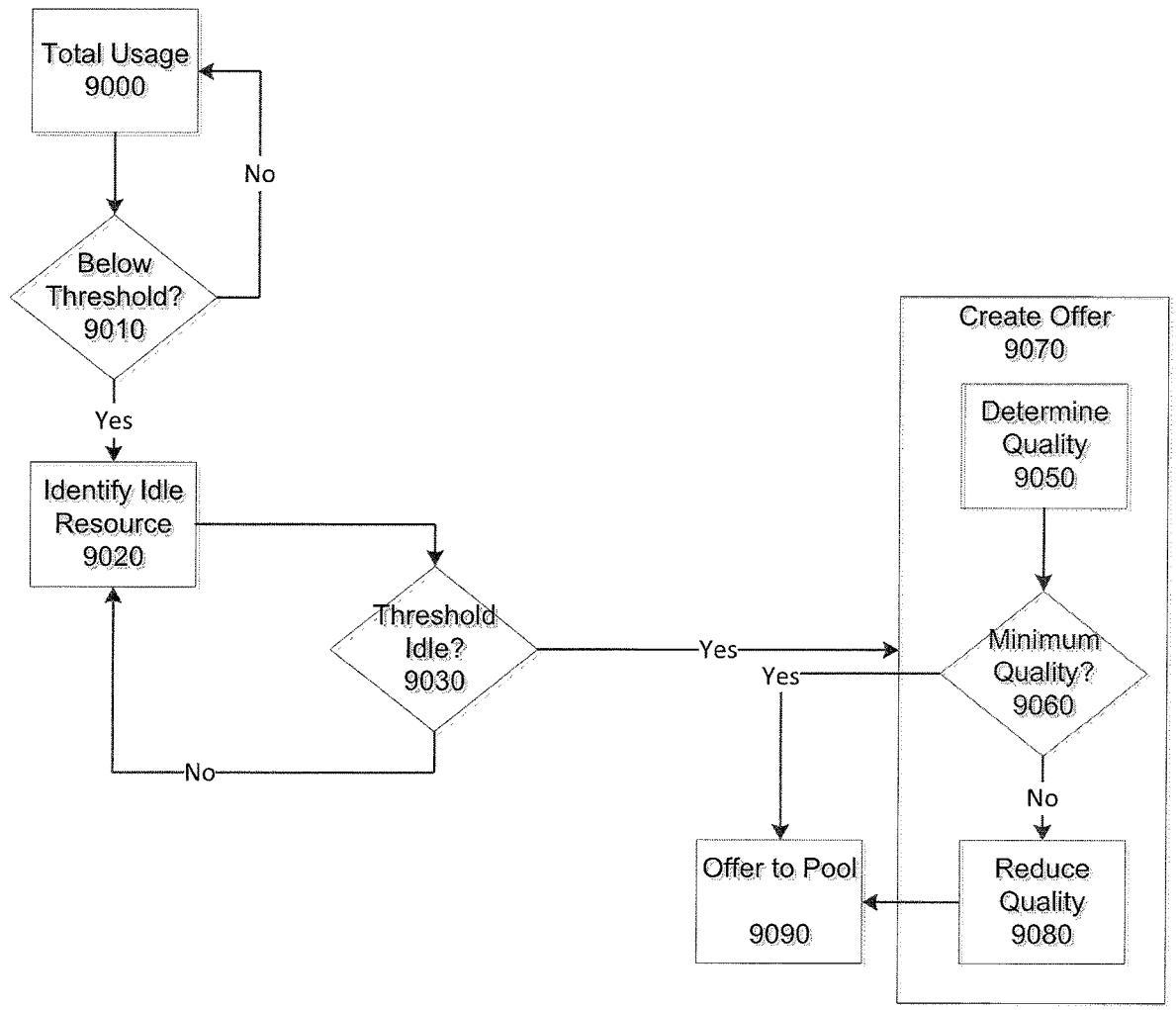
FIG. 3 shows a block diagram representing an embodiment of a process of offering a returned resource as described herein.

An embodiment of a resource return process is depicted in FIG. 3. In the embodiment shown, a resource usage 9000 of a particular task or task group may be assessed or monitored to determine if overall resource usage levels are below a certain threshold 9010. Such usage levels may be evaluated in the context of one or more resource pools from which the task or task group is drawing resources. Such a threshold may be determined based on known or expected usage levels, usage trend or other historical data analysis, or derived from the size of the allocation (e.g., less than 95% of the allocated resources)

If total resource usage 9000 is determined or predicted to be at or above a threshold level or amount 9010, nothing else happens and the total resource usage 9000 of the particular task or task group may continue to be assessed or monitored. If total resource usage 9000 is determined or predicted to fall below a threshold level or amount 9010, one or more idle or unused resources may be identified 9020. In some embodiments, a resource may be identified as idle 9020 based solely on usage determination or prediction 9000. In some such embodiments, a quantity threshold evaluation 9010 may be omitted or performed at a later time or combined with one or more other steps.

An identified resource may also be evaluated to determine if it is likely to remain idle or otherwise unused for a threshold period of time 9030. Such evaluation may be performed through evaluations of usage levels according to a variety of techniques. In some embodiments, such evaluation may be performed using techniques such as ones discussed in the paper *Idleness is not sloth* by Richard Golding, Peter Bosch, Carl Staelin, Tim Sullivan, and John Wilkes, published and presented at Winter '95 USENIX Technical Conference, New Orleans, La., 16-19 Jan. 1995, pages 201-222, the entire contents of which are hereby incorporated by reference.

In some embodiments, such an evaluation step 9030 may be omitted. In some embodiments, a resource that has not been idle or is not expected to remain idle for at least a minimum time period 9030 may not be a suitable candidate for offer as a returned resource. In such embodiments, a next available idle resource may be evaluated and/or the total resource usage 9000 of the particular task or task group may continue to be assessed or monitored. In some embodiments, a system having usage 9000 below a threshold 9010 may nonetheless have no resources that are candidates for offer as returned resources.

In some embodiments, if a resource is a candidate for offer as a returned resource, an offer representing that resource may be created 9070. This offer may then be used to represent the returned resource created from the idle resource. In some embodiments, the offer may be an embodiment of a logical structure as depicted in FIG. 2. In some embodiments, such a returned resource offer may be created by a system or scheduler or application administering one or more of the resource pools from which tasks are consuming resources.

As part of the offer creation process 9070, a quality of the returned resource may be determined 9050 based on a quality of the idle resource and, in some embodiments, based on known or expected outages or preemptions of the idle resource. In some embodiments, a determined quality 9050 of the returned resource may be based on the known or established quality of the originally allocated resource that is being returned because it is idle. In some embodiments, if the quality is at or below a known or established minimum quality 9060, no further adjustment to resource quality may be required and the resource may be in an offer 9090 claimed by another pool as a returned resource. In embodiments where the determined availability or reliability quality 9050 of the returned resource is not at or below a known or established minimum quality 9060, a reduction in resource availability or reliability quality 9080 may be required before the returned resource can be offered for claim by a resource pool 9090 as a returned resource.

In some embodiments, a resource availability or reliability quality such as a failure-quality may be determined 9050 by starting with the failure-quality/qualities of the resource(s) that were offered to the pool and about to be returned, and degrading these based on one or more estimates of mis-predictions of whether the resources will be available to be returned (e.g., because they will be needed, and not idle). For example, a quality of the returned resource may be initially estimated 9050 based on expected or predicted variations in overall task or system usage, potential underlying hardware faults, and other factors that may potentially cause an outage in the returned resource. In such embodiments, the quality reduction 9080 may be based on a known or estimated likelihood of having incorrectly predicted how long the underlying idle resource will remain idle. In some embodiments, such predictions and estimates may be generated with or by an idleness detector.

In some embodiments, information about when and for how long and with what likelihood a resource will be available may be recorded or otherwise tracked. In some embodiments, a scheduler may record or otherwise track some or all of such resource availability information. In such embodiments, the returned offers may reflect information about the predicted lifetimes of resources from which they are derived. In some embodiments, a scheduler may also manage some or all resource allocations in the computing resource environment.

Figure 4:
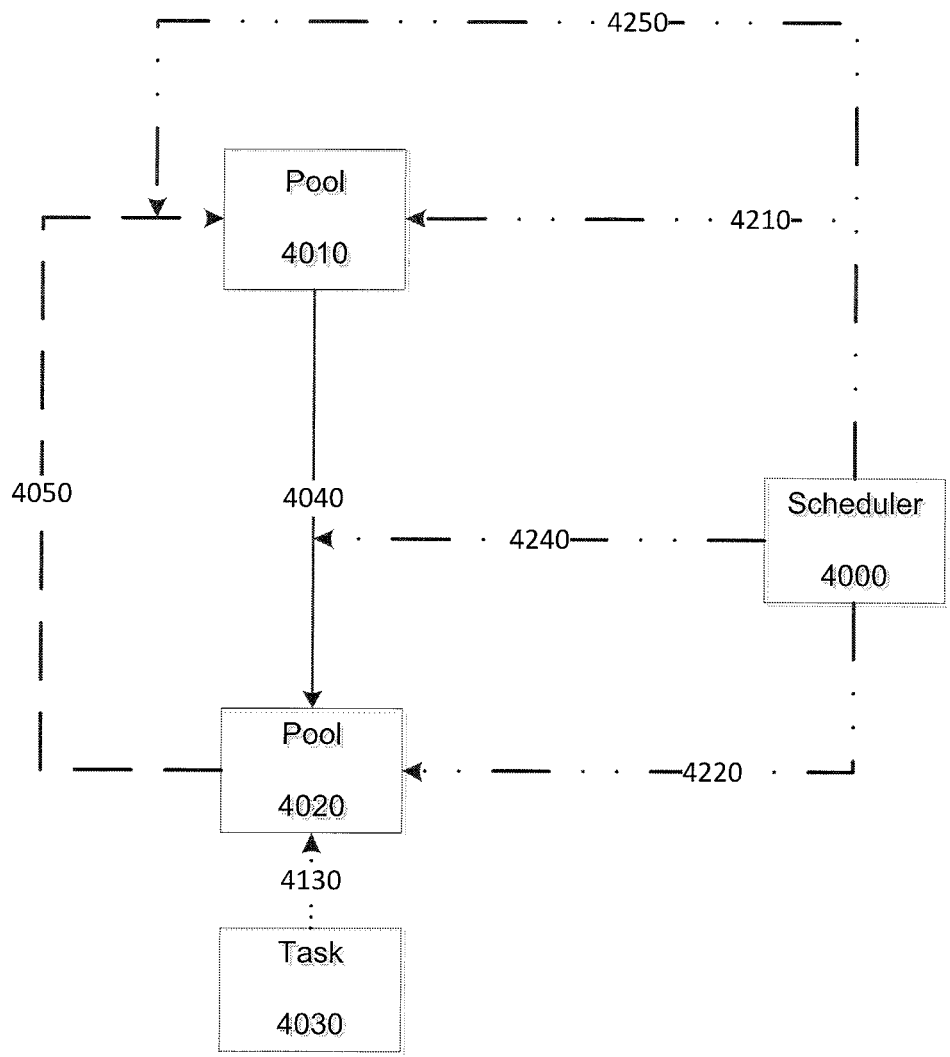
FIG. 4 shows a block diagram representing an embodiment of a resource scheduling and management system as described herein.

An embodiment showing an interaction between a scheduler and resource pools in a computing resource environment is depicted in FIG. 4. In the embodiment shown, a pool 4010 of resources may have some of its resources claimed 4040 by a resource pool 4020 and made available for consumption 4130 by a task 4030. The process of making the claim 4040, as well as creation and management of the pools 4010, 4020 may be handled by a scheduler 4000.

The scheduler 4000 may, in some embodiments, manage all offers and claims of resources in a computing resource environment. In some embodiments, more than one scheduler 4000 may be employed. In some embodiments, a computing resource environment may have multiple schedulers with redundant or overlapping resource and resource pool management tasks or capabilities. In some embodiments, separate schedulers may operate on discrete groups or sets of resources or particular groups of tasks such that two different schedulers may each handle completely disparate task and/or resource groups.

In the embodiment shown, the scheduler 4000 may create 4210 a pool 4010 as an allocation pool from which to further distribute resources. The scheduler 4000 may also create 4230 or manage task(s) 4030 and may govern their execution. In response to a decision or request to execute a particular task 4030, the scheduler may create 4220 a task-available resource pool 4020 by claiming 4040 resources from the allocation pool 4010. The scheduler 4000 may also create 4240 and manage the claim 4040 of resources from the allocation pool 4010 to the task-available pool 4020. The task 4030 may then consume 4130 resources from the task-available pool 4020.

In the embodiment shown, the task-available pool 4020 may include idle or unused resources that are suitable to be offered back 4050 to the allocation pool 4010 as returned resources. The scheduler 4000 may also create and manage 4250 the offer 4050 of returned resources from the task-available pool 4020 to the allocation pool 4010 or to any other resource pool in the computing resource environment (not shown).

In some embodiments, one or more of the pools 4010, 4020 and scheduler(s) 4000 may be realized as one or more (or combinations) of physical or logical or programmatic components or portions in a computing resource environment. In some embodiments, resource scheduler and/or offer or claim management capabilities may be embodied within one or more physical or virtual computing devices. Such computing device(s) may be specifically configured with hardware and/or software to provide the desired capabilities and functions.

Figure 5:
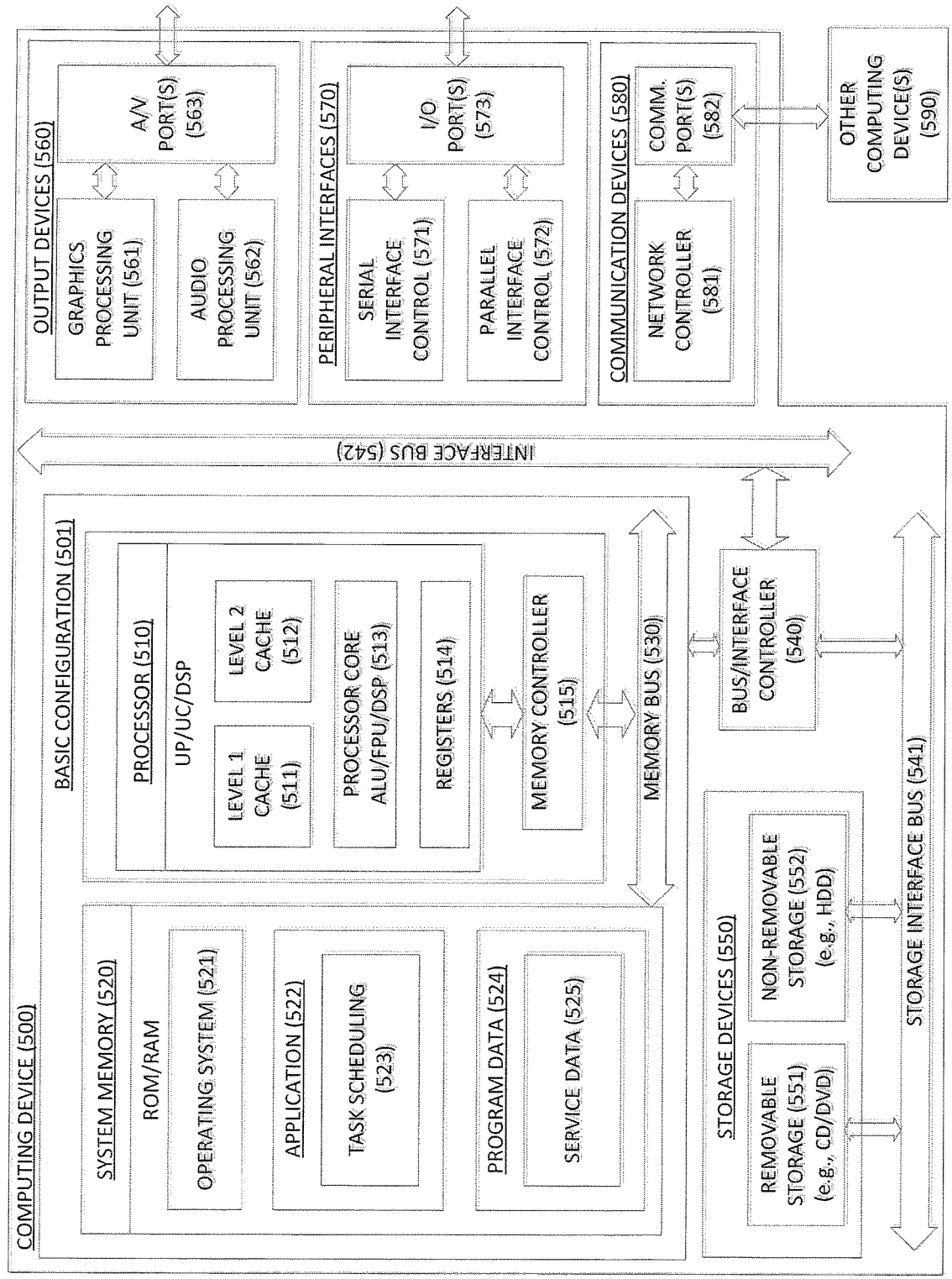
FIG. 5 shows an embodiment of a computing system configured to operate part or all of an embodiment of a computing resource environment as described herein.

FIG. 5 is a block diagram illustrating an example computing device 500 that is arranged to perform resource offer management techniques as described herein. In a very basic configuration 501, computing device 500 typically includes one or more processors 510 and system memory 520. A memory bus 530 can be used for communicating between the processor 510 and the system memory 520.

Depending on the desired configuration, processor 510 can be of any type including but not limited to a microprocessor (μP), a microcontroller (μC), a digital signal processor (DSP), or any combination thereof. Processor 510 can include one more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 typically includes an operating system 521, one or more applications 522, and program data 524. Application 522 may include a resource management or scheduling feature 523 as discussed herein. Program Data 524 includes location data such as one or more name schemas or object name lists 525 that are useful for performing the desired operations as described above. In some embodiments, application 522 can be arranged to operate with program data 524 on an operating system 521 such that the overall system performs one or more specific variations of techniques as discussed herein. This described basic configuration is illustrated in FIG. 4 by those components within line 501.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, camera, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication via one or more communication ports 582.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

In some cases, little distinction remains between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Only exemplary embodiments of the systems and solutions discussed herein are shown and described in the present disclosure. It is to be understood that the systems and solutions discussed herein are capable of use in various other combinations and environments and are capable of changes or modifications within the scope of the concepts as expressed herein. Some variations may be embodied in combinations of hardware, firmware, and/or software. Some variations may be embodied at least in part on computer-readable storage media such as memory chips, hard drives, flash memory, optical storage media, or as fully or partially compiled programs suitable for transmission to/download by/installation on various hardware devices and/or combinations/collections of hardware devices. Such variations are not to be regarded as departure from the spirit and scope of the systems and solutions discussed herein, and all such modifications as would be obvious to one skilled in the art are intended to be included within the scope of the following claims:

The invention claimed is:

1. A method of offering at least a portion of a previously-allocated resource to a second resource pool from a first resource pool in a computing resource environment, the method comprising:
    offering, from the second resource pool to the first resource pool, a first resource associated with a first resource quality, wherein the first resource quality represents a likelihood that the first resource in the second resource pool will not be evicted from the first resource pool or experience an outage while assigned to the first resource pool;
    assigning, from the first resource pool, the first resource to a first task;
    identifying a first portion of the first resource assigned to the first task based on a likelihood of the first portion being unused by the first task;
    offering the first portion of the first resource assigned to the first task to the second resource pool as a second resource associated with a second resource quality, wherein the second resource quality is set lower than the first resource quality; and
    increasing resource availability for consumption by the second resource pool by claiming the second resource for the second resource pool from the first resource pool.

2. The method of claim 1, wherein the first and second resource qualities each representing one of a plurality of quality levels, the quality levels including at least a highest level and a lowest level.

3. The method of claim 2, further comprising determining that the first resource quality is at a lowest quality; and in response to a determination that the first resource quality is at the lowest quality, setting the second resource quality to be the same as the first resource quality.

4. The method of claim 1, the method further comprising:
    in response to an indication that the first resource is now being utilized for execution of the first task, causing a resource outage in the second resource such that the second resource pool is prevented from utilizing the second resource while the first task is utilizing the first resource.

5. The method of claim 1, where the first resource includes at least one of a physical storage location, a processor, a process thread, memory access, memory space, storage space, network bandwidth, and storage access.

6. The method of claim 1, where offering includes offering for a set time period.

7. The method of claim 1, wherein offering includes offering the second resource for not more than an offer lifetime based on a time specification associated with the second resource.

8. The method of claim 1, the method further comprising rescinding the offer of the second resource in response to an outage of the first resource.

9. A method of offering at least a portion of a previously allocated resource to a resource pool in a computing resource environment, the method comprising:
    offering, from a second resource pool to a first resource pool, a first resource associated with a first resource quality, wherein the first resource quality represents a likelihood that the first resource in the second resource pool will not be evicted from the first resource pool or experience an outage while assigned to the first resource pool;
    assigning, from the first resource pool, the first resource to a first task;
    identifying a first portion of the first resource assigned to the first task based on a likelihood of the first portion being unused by the first task;
    creating a claim object that defines a second resource based on the first portion of the first resource assigned to the first task, the claim object including a second resource quality set lower than the first resource quality;
    adding the second resource defined by the claim object to the second resource pool, the second resource pool being different from the first resource pool; and
    increasing resource availability for consumption by the second resource pool by claiming the second resource for the second resource pool.

10. The method of claim 9, wherein the claim object includes a time specification defining a lifetime of the claim object.

11. The method of claim 10, wherein said adding the second resource including adding the second resource to the second resource pool for a time period not greater than the defined lifetime of the claim object.

12. The method of claim 9, wherein said adding being accomplished by including information identifying the second resource as being associated with the second pool in the claim object.

13. The method of claim 9, where the second resource is defined by a resource specification included in the claim object.

14. The method of claim 9, wherein the second resource quality being represented by a forgiveness or failure specification included in the claim object.

15. The method of claim 9, wherein the step of creating being controlled by a scheduler in the computing resource environment.

16. In a computing resource environment including at least one resource capable of being allocated to at least one of a first resource pool and a second resource pool, a method comprising:
    identifying a first resource that is allocated to the first resource pool;
    first defining a second resource based on the first resource, said first defining including:
        establishing a second resource quantity for the second resource that is no larger than a first resource quantity of the first resource, and
        establishing a second resource quality for the second resource that is based on a first resource quality associated with the first resource, the second resource quality being lower than the first resource quality, wherein the first resource quality represents a likelihood that the first resource in the second resource pool will not be evicted from the first resource pool or experience an outage while assigned to the first resource pool;
    first creating an offer for the second resource to the second resource pool, the first created offer including information about the second resource quality and the second resource quantity;
    determining that the second resource is unused with respect to the second resource pool;
    second defining a third resource based on the unused second resource, said second defining including
        establishing a third resource quantity for the third resource that is no larger than the second resource quantity, and
        establishing a third resource quality for the third resource that is based on the second resource quality;
    second creating an offer for the third resource to the first resource pool, the second created offer including information about the third resource quality and the third resource quantity; and
    increasing resource availability for consumption by at least one of the first and second resource pools by claiming the at least one resource capable of being allocated to the at least one of the first and second resource pools.

17. The method of claim 16, where a resource quality is represented by a plurality of discrete quality levels.

18. The method of claim 17, where the third resource quality is at the lowest quality level.

19. The method of claim 18, where at least one of the first resource quality and the second resource quality is at a level above the lowest quality level.

20. A system for offering at least a portion of a previously-allocated resource to a second resource pool from a first resource pool in a computing resource environment, comprising:
    one or more processors, and
    memory storing instructions, the instructions being executable by the one or more computing devices,
    wherein the instructions comprise:
    receiving a first claim for resources, the claim identifying a first amount of resources to be reserved for a first task;
    assigning a first resource from a first resource pool to the first task, the first resource being associated with a first quality level, the first quality level representing a likelihood that the first resource will not be evicted from the first resource pool or experience an outage while assigned to the first resource pool;
    determining a second amount of the first resource, the second amount representing a portion of the first resource that is assigned to the first task and unlikely to be used by the first task;
    determining a second quality level, the second quality level being less than the first quality level, wherein the second quality level represents a likelihood that the second amount of the first resource in the first resource pool will not be evicted from the second resource pool or experience an outage while assigned to the second resource pool;
    offering, to a second resource pool, the second amount of the first resource as a second resource associated with the second quality level;
    receiving a second claim for resources to be reserved for a second task;
    assigning the second recourse from the second resource pool to the second task, wherein the both the first task and the second task use the first resource;
    evicting the second task from the first resource when the first task requires the portion of the first resource used by the second task; and
    increasing resource availability for consumption by the second resource pool by claiming the second resource for the second resource pool.

21. The system of claim 20, wherein offering the second amount of the first resource to the second resource pool comprises offering the second amount from the first resource pool to a third resource pool, and offering the second amount from the third resource pool to the second resource pool.

22. The system of claim 20, wherein the first and second resource qualities each representing one of a plurality of quality levels, the quality levels including at least a highest level and a lowest level.

23. The system of claim 20, wherein the instructions further comprise determining whether the first quality level is at a lowest quality level and setting the second quality level to be less than the first quality level in response to a determination that the first quality level is not at the lowest quality level; and wherein the instructions further comprise setting the second quality level to be the same as the first quality level in response to a determination that the first quality level is at the lowest quality level.

24. The system of claim 20, wherein the instructions further comprise, in response to an indication that the first resource is now being utilized for execution of the first task, causing a resource outage in the second resource such that the second resource pool is prevented from utilizing the first resource while the first task is utilizing the first resource.

25. The system of claim 20, where the first resource includes at least one of a physical storage location, a processor, a process thread, memory access, memory space, storage space, network bandwidth, and storage access.

26. The system of claim 20, where offering includes offering for a set time period.

* * * * *